(12) United States Patent
Yasuda

(10) Patent No.: US 9,766,634 B2
(45) Date of Patent: Sep. 19, 2017

(54) FLUID MECHANISM, SUPPORT MEMBER CONSTITUTING FLUID MECHANISM AND FLUID CONTROL SYSTEM

(71) Applicant: HORIBA STEC, Co., Ltd., Kyoto-shi, Kyoto (JP)

(72) Inventor: Tadahiro Yasuda, Kyoto (JP)

(73) Assignee: HORIBA STEC, Co., Ltd., Kyoto-shi, Kyoto (JP)

( * ) Notice: Subject to any disclaimer, the term of this patent is extended or adjusted under 35 U.S.C. 154(b) by 0 days.

(21) Appl. No.: 14/925,830

(22) Filed: Oct. 28, 2015

(65) Prior Publication Data

US 2016/0048136 A1 Feb. 18, 2016

Related U.S. Application Data

(62) Division of application No. 13/645,845, filed on Oct. 5, 2012, now Pat. No. 9,188,990.

(30) Foreign Application Priority Data

Oct. 5, 2011 (JP) .................................. 2011-221065
Oct. 6, 2011 (JP) .................................. 2011-222058

(51) Int. Cl.
*G05F 5/00* (2006.01)
*F16K 27/00* (2006.01)
(Continued)

(52) U.S. Cl.
CPC .......... *G05D 7/0635* (2013.01); *F16K 27/003* (2013.01); *G01F 5/00* (2013.01);
(Continued)

(58) Field of Classification Search
CPC ....... G05D 7/0635; F16K 27/003; G01F 5/00; Y10T 137/87249; Y10T 137/87885
(Continued)

(56) References Cited

U.S. PATENT DOCUMENTS 2,331,133 A * 10/1943 Nardone ................. F16K 27/06
137/494
3,134,395 A * 5/1964 Glasgow ................. B67D 7/78
137/315.01
(Continued)

FOREIGN PATENT DOCUMENTS

JP 51014120 B 5/1976
JP H05172265 A 7/1993
(Continued)

OTHER PUBLICATIONS

State Intellectual Property Office of the People's Republic of China, First Office Action Issued in Chinese Patent Application No. 201210377845.3, Mar. 2, 2016, 12 pages.

*Primary Examiner* — Mary McManmon
*Assistant Examiner* — David Colon Morales
(74) *Attorney, Agent, or Firm* — Alleman Hall Creasman & Tuttle LLP

(57) ABSTRACT

This invention provides a fluid mechanism that can arrange a plurality of fluid device units and external fluid devices mounted as a set on the fluid device units effectively and compactly. Each of the fluid device units is arranged with respective side surfaces in a longitudinal direction of the fluid device unit tightly attached, and the external fluid devices are arranged side-by-side external to and outside of the fluid device unit in the width direction. Furthermore, as for an introducing path and a discharging path that connect the external fluid devices and the fluid device unit, the introducing path, which is short, is connected to the discharging path, which is long.

5 Claims, 19 Drawing Sheets

(51) Int. Cl.
*G05D 7/06* (2006.01)
*G01F 5/00* (2006.01)

(52) U.S. Cl.
CPC ............. *Y10T 137/87249* (2015.04); *Y10T 137/87885* (2015.04)

(58) Field of Classification Search
USPC ................................................. 138/42, 44
See application file for complete search history.

(56) References Cited

U.S. PATENT DOCUMENTS

| | | | | |
|---|---|---|---|---|
| 3,417,779 A * | 12/1968 | Golay | ............... | B01F 3/026 137/597 |
| 3,464,434 A * | 9/1969 | Nielsen | ............... | B01F 3/026 137/340 |
| 3,512,553 A * | 5/1970 | Legris | ............... | F15B 13/08 137/271 |
| 3,532,126 A * | 10/1970 | Boothe | ............... | F15C 1/02 137/614.11 |
| 3,532,127 A * | 10/1970 | Bottone, Jr | ............... | A61M 5/16877 137/614.11 |
| 3,599,525 A | 8/1971 | Klann | | |
| 3,744,376 A * | 7/1973 | Carpenter | ............... | F15B 13/06 137/12 |
| 3,750,687 A * | 8/1973 | Williams | ............... | F17D 3/05 137/1 |
| 3,765,441 A * | 10/1973 | Chang | ............... | F15B 13/081 137/271 |
| 3,788,344 A * | 1/1974 | Dyck | ............... | F16K 27/003 137/271 |
| 3,856,049 A * | 12/1974 | Scull | ............... | F16L 55/02781 138/37 |
| 3,881,513 A * | 5/1975 | Chang | ............... | F15C 3/06 137/271 |
| 3,886,971 A * | 6/1975 | Lundsgaard | ............... | B01F 15/0404 137/599.04 |
| 4,046,158 A * | 9/1977 | Hayashi | ............... | G01N 1/38 137/597 |
| 4,257,439 A * | 3/1981 | Mayeaux | ............... | B01F 3/02 137/563 |
| 4,427,030 A * | 1/1984 | Jouwsma | ............... | G01F 1/40 138/40 |
| 4,711,268 A * | 12/1987 | Coleman | ............... | F16K 11/22 137/597 |
| 4,805,656 A * | 2/1989 | Cole | ............... | B65D 88/72 138/41 |
| 4,905,497 A * | 3/1990 | Shindo | ............... | B01F 3/02 137/606 |
| 5,080,131 A * | 1/1992 | Ono | ............... | G01F 1/6842 137/486 |
| 5,123,443 A * | 6/1992 | Garrison | ............... | B01J 19/0046 137/565.15 |
| 5,267,585 A * | 12/1993 | Jones | ............... | F16K 7/20 134/166 C |
| 5,275,201 A * | 1/1994 | Zimmerly | ............... | C12N 15/1132 137/454.6 |
| 5,368,062 A * | 11/1994 | Okumura | ............... | C23C 16/4401 137/240 |
| 5,488,967 A * | 2/1996 | Minami | ............... | B01J 4/008 137/1 |
| 5,511,416 A * | 4/1996 | Shambayati | ............... | F15D 1/02 138/43 |
| 5,605,179 A * | 2/1997 | Strong, Jr. | ............... | F16K 27/003 137/240 |
| 5,672,821 A * | 9/1997 | Suzuki | ............... | G01F 1/684 138/42 |
| 5,765,591 A * | 6/1998 | Wasson | ............... | B01J 19/0046 137/597 |
| 5,769,110 A | 6/1998 | Ohmi et al. | | |
| 5,803,123 A | 9/1998 | Bell et al. | | |
| 5,819,782 A | 10/1998 | Itafuji | | |
| 5,819,803 A * | 10/1998 | Lebo | ............... | F16K 47/08 137/625.3 |
| 5,823,228 A * | 10/1998 | Chou | ............... | F16K 27/003 137/557 |
| 5,836,355 A | 11/1998 | Markulec et al. | | |
| 5,860,676 A | 1/1999 | Brzezicki et al. | | |
| 5,887,977 A * | 3/1999 | Morikawa | ............... | B01F 5/0604 138/42 |
| 5,904,424 A * | 5/1999 | Schwesinger | ............... | B01F 5/0604 138/42 |
| 5,983,933 A | 11/1999 | Ohmi et al. | | |
| 5,992,463 A | 11/1999 | Redemann et al. | | |
| 6,012,478 A * | 1/2000 | Park | ............... | F17C 13/04 137/240 |
| 6,035,893 A | 3/2000 | Ohmi et al. | | |
| 6,062,256 A * | 5/2000 | Miller | ............... | F16K 31/004 137/487.5 |
| 6,152,175 A | 11/2000 | Itoh et al. | | |
| 6,202,687 B1 * | 3/2001 | Park | ............... | B01J 4/02 137/597 |
| 6,349,744 B1 | 2/2002 | Grosshart | | |
| 6,394,138 B1 | 5/2002 | Vu et al. | | |
| 6,615,871 B2 | 9/2003 | Ohmi et al. | | |
| 6,719,222 B2 | 4/2004 | Mebberson | | |
| 6,802,333 B2 | 10/2004 | Balazy et al. | | |
| 6,827,095 B2 | 12/2004 | O'Connor et al. | | |
| 7,004,199 B1 | 2/2006 | Funes et al. | | |
| 7,055,550 B2 | 6/2006 | Harris et al. | | |
| 7,152,629 B2 | 12/2006 | Tokuda et al. | | |
| 7,178,556 B2 | 2/2007 | Reid, II et al. | | |
| 7,320,339 B2 | 1/2008 | Milburn | | |
| 7,320,340 B2 * | 1/2008 | Bush | ............... | F16K 47/10 138/42 |
| 7,370,674 B2 | 5/2008 | Doyle | | |
| 7,418,978 B2 | 9/2008 | Chao et al. | | |
| 7,472,887 B2 | 1/2009 | Ohmi et al. | | |
| 7,850,788 B2 * | 12/2010 | Hopkins | ............... | A23L 3/3409 134/166 R |
| 2001/0015231 A1 * | 8/2001 | Sand | ............... | A01G 25/023 138/42 |
| 2005/0072481 A1 | 4/2005 | Hanada et al. | | |
| 2006/0060253 A1 | 3/2006 | Yoshida et al. | | |
| 2006/0070674 A1 | 4/2006 | Eidsmore | | |
| 2006/0096533 A1 | 5/2006 | Mochizuki et al. | | |
| 2008/0041481 A1 * | 2/2008 | Mudd | ............... | G01F 1/40 138/42 |
| 2008/0069702 A1 | 3/2008 | Okabe et al. | | |
| 2008/0087348 A1 * | 4/2008 | Gillis | ............... | B01F 5/0475 137/896 |
| 2008/0115850 A1 | 5/2008 | Eriksson et al. | | |
| 2008/0173366 A1 | 7/2008 | Kwon | | |
| 2008/0271800 A1 | 11/2008 | Curran et al. | | |
| 2008/0302434 A1 * | 12/2008 | Taskar | ............... | F16K 27/003 137/884 |
| 2009/0095354 A1 * | 4/2009 | Taskar | ............... | F16L 41/03 137/15.01 |
| 2009/0183792 A1 | 7/2009 | Tokuda et al. | | |
| 2009/0255596 A1 * | 10/2009 | Leys | ............... | B01F 5/0077 137/606 |
| 2009/0308474 A1 * | 12/2009 | Igarashi | ............... | F16K 27/003 137/861 |
| 2009/0320754 A1 | 12/2009 | Oya et al. | | |
| 2010/0229963 A1 * | 9/2010 | Igarashi | ............... | F15B 13/0814 137/343 |
| 2011/0024513 A1 * | 2/2011 | Davidson | ............... | F16K 11/044 236/12.1 |
| 2012/0180876 A1 | 7/2012 | Hayashi et al. | | |

FOREIGN PATENT DOCUMENTS

| | | |
|---|---|---|
| JP | 06307734 A | 11/1994 |
| JP | 2002349797 A | 12/2002 |
| JP | 2003091322 A | 3/2003 |
| JP | 2007170484 A | 7/2007 |
| JP | 2007327542 A | 12/2007 |
| JP | 2008009554 A | 1/2008 |
| JP | 2008298180 A | 12/2008 |

(56) References Cited

FOREIGN PATENT DOCUMENTS

| | | | |
|---|---|---|---|
| JP | 2010203533 | A | 9/2010 |
| JP | 2010204899 | A | 9/2010 |
| JP | 2011154433 | A | 8/2011 |
| WO | 2004070801 | A1 | 8/2004 |
| WO | 2008023711 | A1 | 2/2008 |
| WO | 2009123009 | A1 | 10/2009 |
| WO | 2011040270 | A1 | 4/2011 |

* cited by examiner

FLUID MECHANISM, SUPPORT MEMBER CONSTITUTING FLUID MECHANISM AND FLUID CONTROL SYSTEM

CROSS REFERENCE TO RELATED APPLICATIONS

The present application is a divisional of U.S. patent application Ser. No. 13/645,845 filed Oct. 5, 2012, entitled "FLUID MECHANISM, SUPPORT MEMBER CONSTITUTING FLUID MECHANISM AND FLUID CONTROL SYSTEM" which claims priority to Japanese Patent Application Ser. Nos. 2011-221065 filed Oct. 5, 2011, and 2011-222058 filed Oct. 6, 2011, the entire contents of which are incorporated herein by reference.

FIELD OF THE ART

This invention relates to a fluid mechanism, a support member constituting the fluid mechanism and a fluid control system that measures or controls a flow rate of, for example, a material gas used for a semiconductor manufacturing process.

BACKGROUND ART

For example, a conventional fluid device unit in the form of a mass flow controller has, as shown in Patent Document 1, a flow rate sensor or a flow rate control valve, and controls a flow rate of a fluid at a set value by an information processing circuit that is separately or integrally provided.

In addition, recently fluid mechanism including mass flow controllers are required to be slim in order to reduce their footprint.

In order to meet this requirement, the present claimed inventor has been developing a mass flow controller whose length in a width direction, i.e., a direction orthogonal to a longitudinal direction viewed from a plan direction, is very short. This mass flow controller comprises one or a plurality of fluid devices between an input port into which a fluid is introduced and an output port from which the fluid discharges, and a direction connecting the input port and the output port viewed from a plan direction is set in the longitudinal direction.

In accordance with this arrangement, even in case of arranging a plurality of fluid paths in parallel, it is possible to configure an extremely compact flow rate control mechanism by arranging a plurality of mass flow controllers in a state of being adjacent each side surface with the longitudinal direction of the fluid device unit substantially parallel each other.

For this kind of the flow rate control mechanism, in addition to the mass flow controllers, auxiliary external fluid devices, such as open/close valves used at a time when the flow rate is to be completely closed or used to halt the mechanism at an abnormal time, are arranged corresponding to each mass flow controllers. Ordinarily these kinds of external fluid devices are arranged in the front and in the rear of the mass flow controller in the longitudinal direction.

In addition, conventionally, in the semiconductor manufacturing process, various component gases are mixed at a predetermined ratio so as to produce a material gas, and the material gas is supplied to inside of a chamber. In order to provide the material gas to the chamber, for example, a gas supply device as shown in Patent Document 2 and Patent Document 3 is used.

Furthermore, since recently a bore of a wafer is enlarged, there is also a case that the material gas is supplied from gas introducing ports arranged at multiple positions in the same chamber. Then a gas supply device further comprising a distributor to divide the mixed material gas into multiple at an arbitrary flow ratio has been developing.

PRIOR ART DOCUMENT

Patent Document

Patent Document 1: Japanese Unexamined Patent Application Publication No. 2011-154433
Patent Document 2: Japanese Unexamined patent Application Publication No. 2010-204899
Patent Document 3: WO2008/023711

DISCLOSURE OF THE INVENTION

Problems to be Solved by the Invention

However, in the case that an arranged size of the external fluid device as viewed in plan view (i.e., as viewed from above) is larger than a width of the mass flow controller, if the external fluid device is arranged in the front and in the rear of the mass flow controller in the longitudinal direction with each of the center lines aligned, there is no other choice but to arrange the mass flow controllers separately as shown in FIG. 10. As a result of this, not only is wasted space generated but also thinning the mass flow controllers becomes basically meaningless. In addition, as shown in FIG. 11, if the center line of the external fluid device and the center line of the mass flow controller are misaligned, the mass flow controllers can be arranged in a state of being adjacent each other. However, it is not preferable in view of the response fluctuation because a length of each flow channel varies. Furthermore, since the external fluid devices are arranged in the front and in the rear of the mass flow controllers in the longitudinal direction, there are limitations in reducing a length as a whole in the longitudinal direction.

The present claimed invention intends to solve the above-mentioned problems, and a main object of this invention is to make it possible to divide the flow rate of the fluid at a predetermined ratio with a compact and simple configuration while a plurality of the fluid device units and the external fluid devices that are mounted on the fluid device units with a set are arranged efficiently and compactly. In addition, the present claimed invention intends to avoid the fluctuation of the response in supplying the fluid by making a length of the fluid flow channel corresponding to each fluid device unit equal as much as possible.

In addition, conventionally since a fluid resistive element is arranged for each of the divided flow channel, if a number of the divided channels increases, there is a problem of being bulky.

Furthermore, with the conventional arrangement having the fluid resistive element for each divided flow channel, although it is possible control a flow ratio of the material gas to each gas introducing port, a concentration of the material gas cannot be controlled. In order to control the concentration individually, the material gas supply system to each gas introducing port may be arranged respectively and independently. However, this arrangement is not realistic because the cost increases and the size becomes bulky.

The present claimed invention intends to solve all of the problems and a main object of this invention is to make it possible to mix the fluid with while downsizing and simplifying the fluid mechanism.

Means to Solve the Problems

More specifically, the fluid mechanism in accordance with this invention comprises a plurality of fluid device units where one or a plurality of fluid devices are arranged between an input port into which a fluid flows and an output port from which the fluid flows out and a direction connecting the input port and the output port is set as a longitudinal direction as viewed in plan view, and a support member that supports the fluid device units in a state of being adjacent each other with the longitudinal direction of the fluid device units substantially parallel with each other.

Furthermore, the support member comprises an introducing path that is connected to the input port and that introduces the fluid into the input port, and a discharging path that is connected to the output port and that discharges the fluid from the output port, and is characterized in that an introducing port that is formed at a leading end of the introducing path is arranged at one end external to and outside of the fluid device unit in a width direction, which is a direction orthogonal to the longitudinal direction as viewed in plan view, and a discharging port that is formed at a terminal end of the discharging path is arranged at an opposite end external to and outside of the fluid device unit in the width direction.

In accordance with this arrangement, since the introducing port and the discharging port are arranged not in the front and the rear of the fluid device units in the longitudinal direction but in the side of the fluid device units wherein the fluid device units are arranged with each of the adjacent side surfaces of the fluid device units tightly attached each other, a compact configuration whose area efficiency is improved can be realized, which minimizes the footprint of the fluid mechanism without any wasted space even though the size of the external fluid device to be connected to the introducing port and the discharging port is larger than the width of the fluid device unit. Furthermore, it is possible to suppress the size of the fluid mechanism in the longitudinal direction substantially to the size of the fluid device unit alone in the longitudinal direction.

In addition, the fluid device units may be arranged as follows so as to locate each input port and each output port substantially in series respectively in the width direction, with the fluid device units are arranged such that the respective input port and associated output port for each fluid device unit are located substantially in series in the width direction, where for each fluid device unit, the respective introducing path connects in sequence starting from a first introducing port located at a position nearest to the input port for the fluid device unit among the introducing ports arranged in the longitudinal direction, wherein the input port for the fluid device unit is located at a position nearest to the first introducing port among the input ports arranged in the width direction, and wherein the respective introducing path for the fluid device unit ends with a second introducing port located at a position farthest from the input port for the fluid device unit, and wherein the input port for the fluid device unit is located at a position farthest from the second introducing port, and where for each fluid device unit, the respective discharging path connects in sequence starting from a first discharging port located at a position nearest to the output port for the fluid device unit among the discharging ports arranged in the longitudinal direction, wherein the output port for the fluid device unit is located at a position nearest to the first discharging port among the output ports arranged in the width direction, and wherein the respective discharging path for the fluid device unit ends with a second discharging port located at a position farthest from the output port for the fluid device unit, and wherein the output port for the fluid device unit is located at a position farthest from the second discharging port. With this configuration, when comparing a length of each flow channel from the introducing port to the discharging port, since the short introducing path is connected to the long discharging path, it becomes possible to suppress fluctuation of the length of each flow channel. Accordingly, there is no critical problem in fluctuation of response.

The introducing port and the discharging port are referred to as ports formed at the leading end and the terminal end of the flow channel, however it is not limited to a port having a special physical configuration on which any component can be mounted. For example, in case that two flow channels are continuously formed, the port may be a conceptual form arranged between the two flow channels.

One representative example of a concrete mode which produces the small-footprint effect of this invention more efficiently is the fluid mechanism described above, wherein for each fluid device unit, a corresponding upstream side external fluid device connected to the associated introducing port of the fluid device unit, wherein each upstream side external fluid device is arranged substantially in the longitudinal direction at one end of and external to the corresponding fluid device unit in the width direction, and/or for each fluid device unit, a corresponding downstream side external fluid device connected to the discharging port of the fluid device unit, wherein each downstream side external fluid device is arranged substantially in the longitudinal direction at an opposite end of and external to the corresponding fluid device unit in the width direction, and which is characterized in that a minimum size required for arranging the external fluid device as viewed from plan view is larger than a width of the fluid device unit.

In order to house a length of whole of the system in the longitudinal direction in a length of the fluid device unit in the longitudinal direction, it is preferable that a number of the upstream side external fluid devices and the downstream side external fluid devices is determined so as to make a whole length in the longitudinal direction of the upstream side external fluid devices when arranged and a whole length in the longitudinal direction of the downstream side external fluid devices when arranged substantially equal to or smaller than a length in the longitudinal direction of the fluid device unit.

In order to make it possible to reduce a footprint with a simpler configuration, it is preferable that the support member is in a plate shape, inside of which the introducing path and the discharging path are formed, and on a top surface of which the fluid device units are mounted.

If the fluid device unit further comprises an information processing circuit that controls the fluid device or calculates an output from the fluid device and the information processing circuit is commonly used by each of the fluid device units, it is possible not only to reduce the footprint but also to reduce the cost.

A representative concrete embodiment that prevents the footprint of the fluid mechanism from being enlarged unnecessarily is a fluid mechanism wherein the fluid device unit further comprises first housings each of which covers the fluid device respectively, a second housing that houses the information processing circuit is arranged on top surfaces of the first housings and an outline of the second housing viewed from the plan direction substantially falls in an outline of whole of the first housings each of which is adjacent viewed from the plan direction.

In addition, a fluid control system in accordance with this invention is characterized by comprising a primary flow channel that extends in parallel to an imaginary plane, a plurality of secondary flow channels that intersect with the primary flow channel viewed from a direction orthogonal to the imaginary plane and that are so configured to be connected to the primary flow channel at the intersect points and into which a part of a fluid flowing in the primary flow channel flows, and a fluid resistive element that is arranged in an installation area set at least at one of the intersect points and that determines a ratio of the fluid flow rate flowing from the primary flow channel into the secondary flow channel.

In accordance with this arrangement, since the fluid resistive element is arranged at the intersect point between the primary flow channel and the secondary flow channel, it is possible to omit a flow channel compared with an arrangement where the fluid resistive element is arranged in the middle of the flow channel, and to reduce an area viewed from the imaginary plan direction. In other words, it becomes possible to configure a flow rate control system that can divide the fluid into the secondary flow channels with a simple and small footprint.

In order to make it possible to mix a plurality of the fluids and to control a mixing ratio or a concentration of the fluid, it is preferable that the fluid control system further comprises a fluid supply device connected to each end of the primary flow channel so as to flow the fluid into the primary flow channel from each end respectively.

In order to make it possible to divide a plurality of the fluids or control the mixing ratio of the fluid freely so that a plurality of the mixed fluids whose component, mixing ratio and concentration differs each other can be produced simultaneously while keeping a compact and simple configuration, it is preferable to comprise a plurality of the primary flow channels and preferable that the multiple primary flow channels and the multiple secondary flow channels are so configured in a latticed state as viewed from the direction of the imaginary plane.

As a concrete representative example, the installation area may be arranged in the primary flow channel. More concretely, inside of the fluid resistive element may be formed a large channel where substantially no resistance is generated and a pair of small channels that are bifurcated from the large channel and where resistance is generated, the large channel of the fluid resistive element arranged in the installation area being in communication with the secondary flow channel, and each of the small channels being in communication with the upstream side and the downstream side in the installation area of the primary flow channel respectively.

Effect of the Invention

As mentioned, in accordance with this invention, it becomes possible to arrange a plurality of the fluid device units and a plurality of the external fluid devices that are mounted on the fluid device units with a set effectively and compactly. In addition, it becomes possible to uniform the response characteristic of each fluid from the introducing port to the discharging port by devising a route of the fluid flowing in and out.

Furthermore, in accordance with this invention, it becomes possible to configure the flow rate control system that can divide the flow rate of the fluid with a simple and compact structure having a small footprint. In addition, it becomes possible to mix the fluid by the arrangement wherein each fluid flows in the primary flow channel from each end of the primary flow channel, and furthermore it becomes possible to produce a plurality of the mixed fluids whose component, mixing ratio and concentration differs each other by providing a plurality of the primary flow channels.

BEST MODES OF EMBODYING THE INVENTION

One embodiment of this invention will be explained with reference to drawings.

Figure 1:
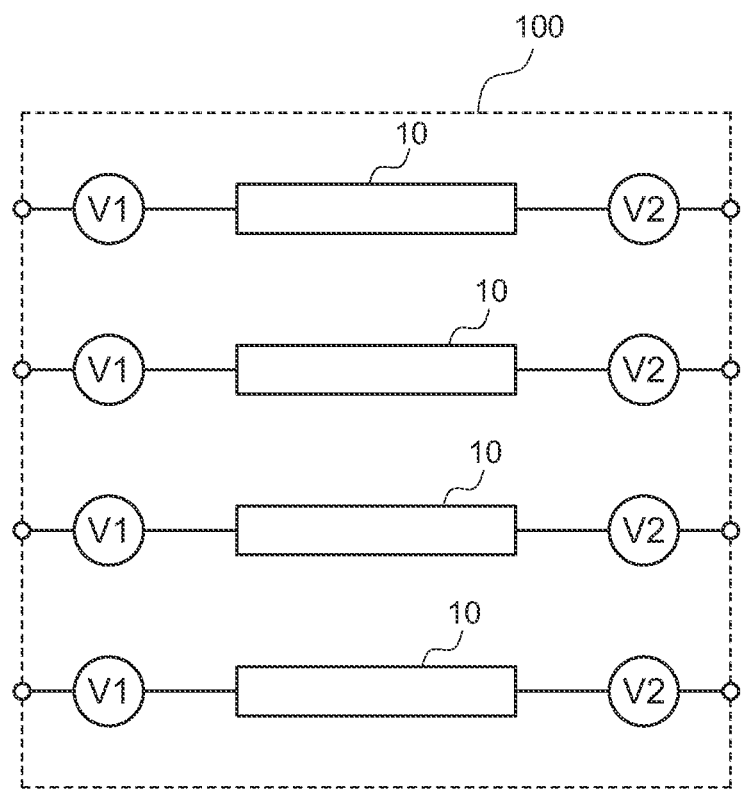
FIG. 1 is a fluid circuit diagram of a fluid mechanism in accordance with one embodiment of this invention.

A fluid mechanism 100 in accordance with this embodiment is used for, for example, a semiconductor manufacturing device, and as an overall fluid circuit diagram is shown in FIG. 1, forms a plurality of (four, in this embodiment) material gas supply lines each of which is arranged in parallel with the others. An upstream side open/close valve V1, which is an upstream side external fluid device, a mass flow controller 10 as being a fluid device unit and a downstream side open/close valve V2, which is a downstream side external fluid device are arranged in this order from the upstream side for each gas supply line so that the flow rate of the material gas independently each other in each material gas supply line.

Figure 2:
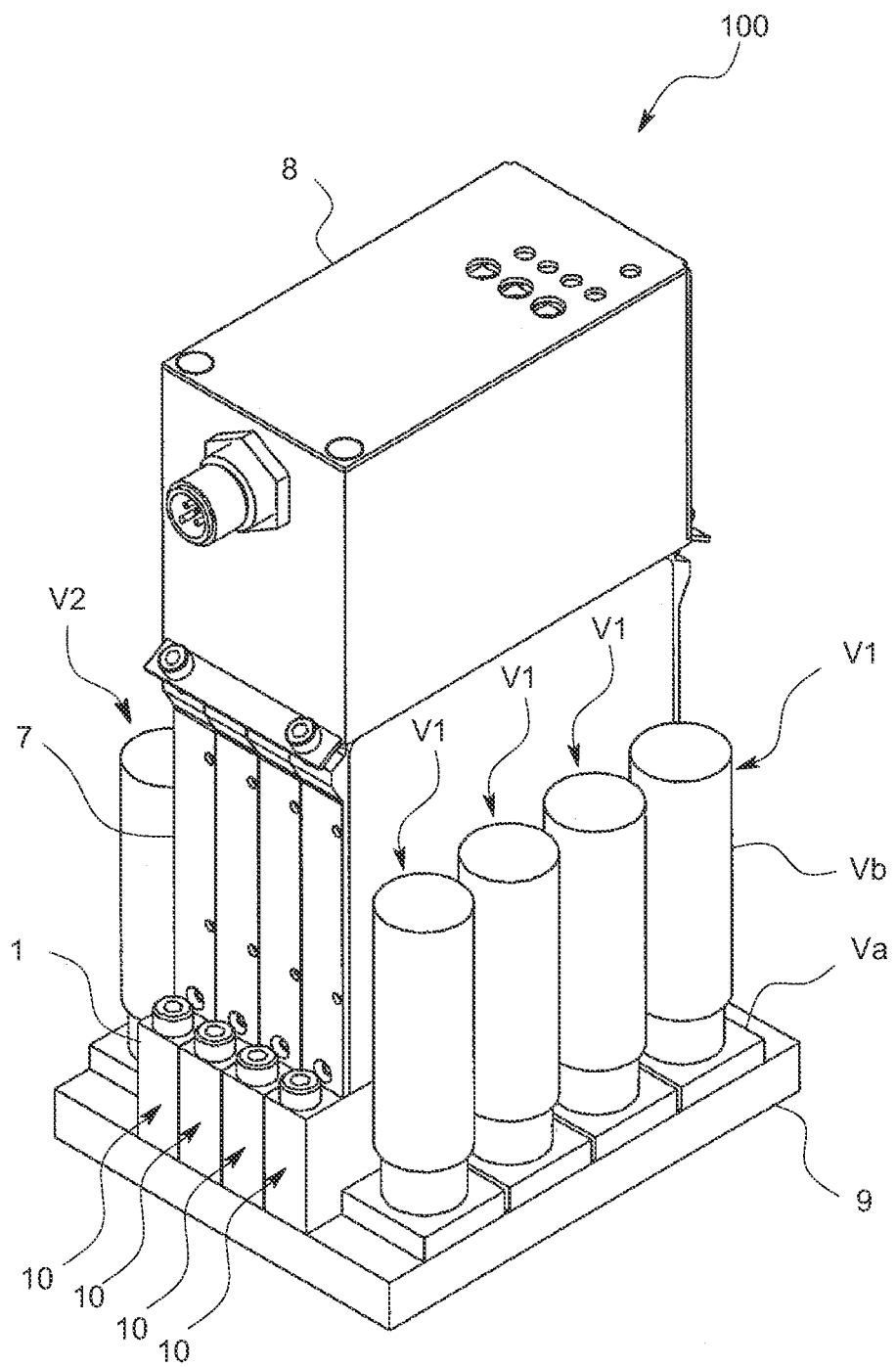
FIG. 2 is an overall perspective view of the fluid mechanism in accordance with this embodiment.

In addition, the fluid mechanism 100 mechanically comprises, as its overall perspective view is shown in FIG. 2, in addition to the upstream side open/close valve V1, the mass flow controller 10 and the downstream side open/close valve V2, a support member 9 that supports the upstream side open/close valve V1, the mass flow controller 10 and the downstream side open/close valve V2. Each component will now be explained below.

Figure 3:
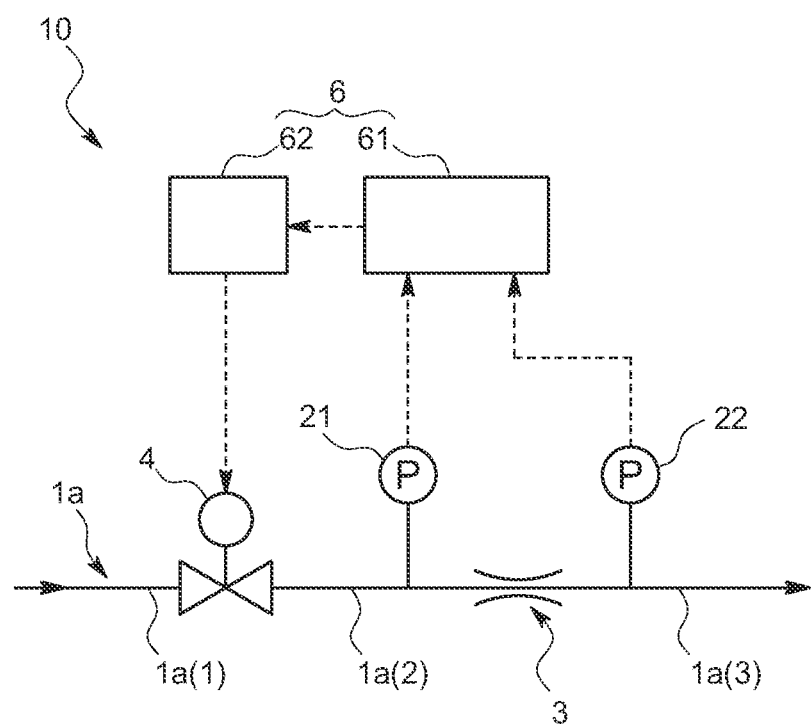
FIG. 3 is a fluid circuit diagram of a mass flow controller in accordance with this embodiment.
Figure 4:
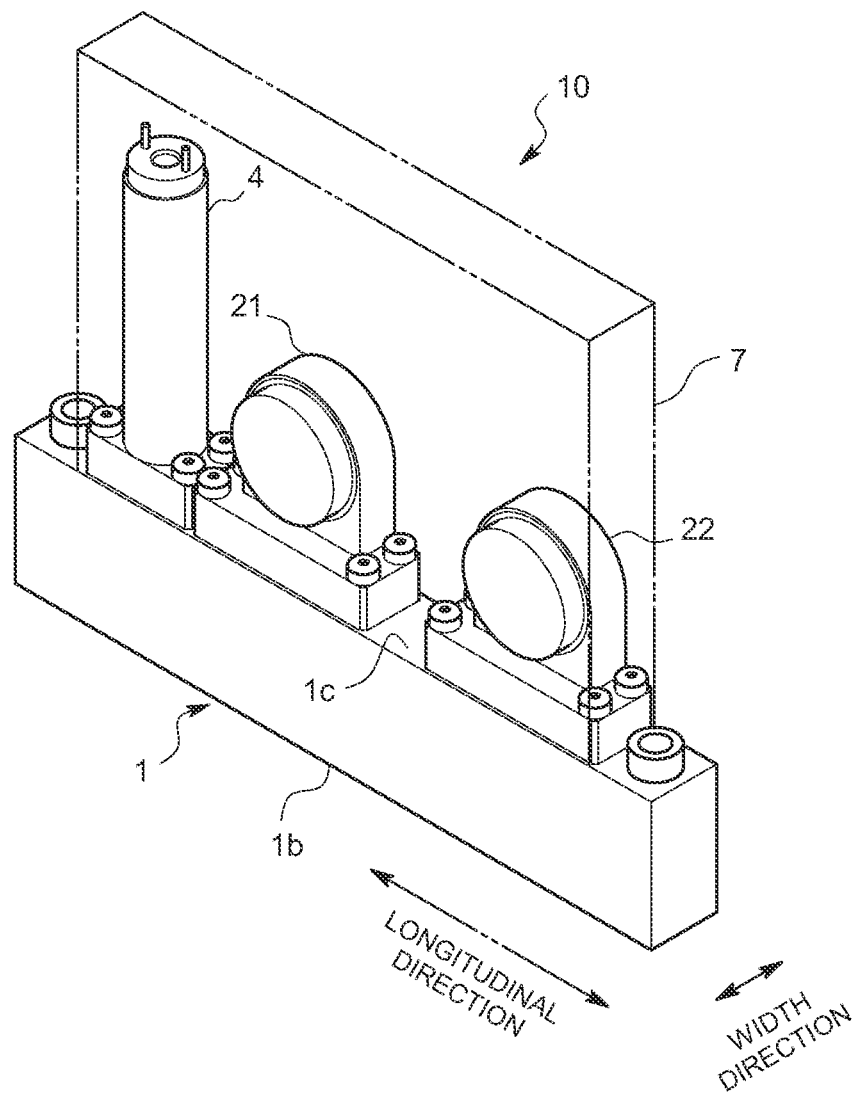
FIG. 4 is an overall perspective view of the mass flow controller in accordance with this embodiment.

The mass flow controller 10 comprises, as shown in its fluid circuit diagram in FIG. 3 and in its perspective view in FIG. 4, a body 1 having an internal flow channel 1a where the fluid flows, a flow rate adjust valve 4, which is a fluid device arranged in the internal flow channel 1a, pressure sensors 21, 22 and a fluid resistive member 3 arranged in the downstream side of the flow rate adjust valve 4 and which is a fluid device for measuring a mass flow rate of the fluid flowing in the internal flow channel 1a, an information processing circuit 6 that calculates the flow rate flowing in the internal flow channel 1a based on the pressure measured by the pressure sensors 21, 22 and that controls the flow rate adjust valve 4 so as to make the measured flow rate at a previously determined target flow rate, and a first housing 7 that is mounted on the body 1 and that covers the flow rate adjust valve 4 and the pressure sensors 21, 22.

Figure 5:
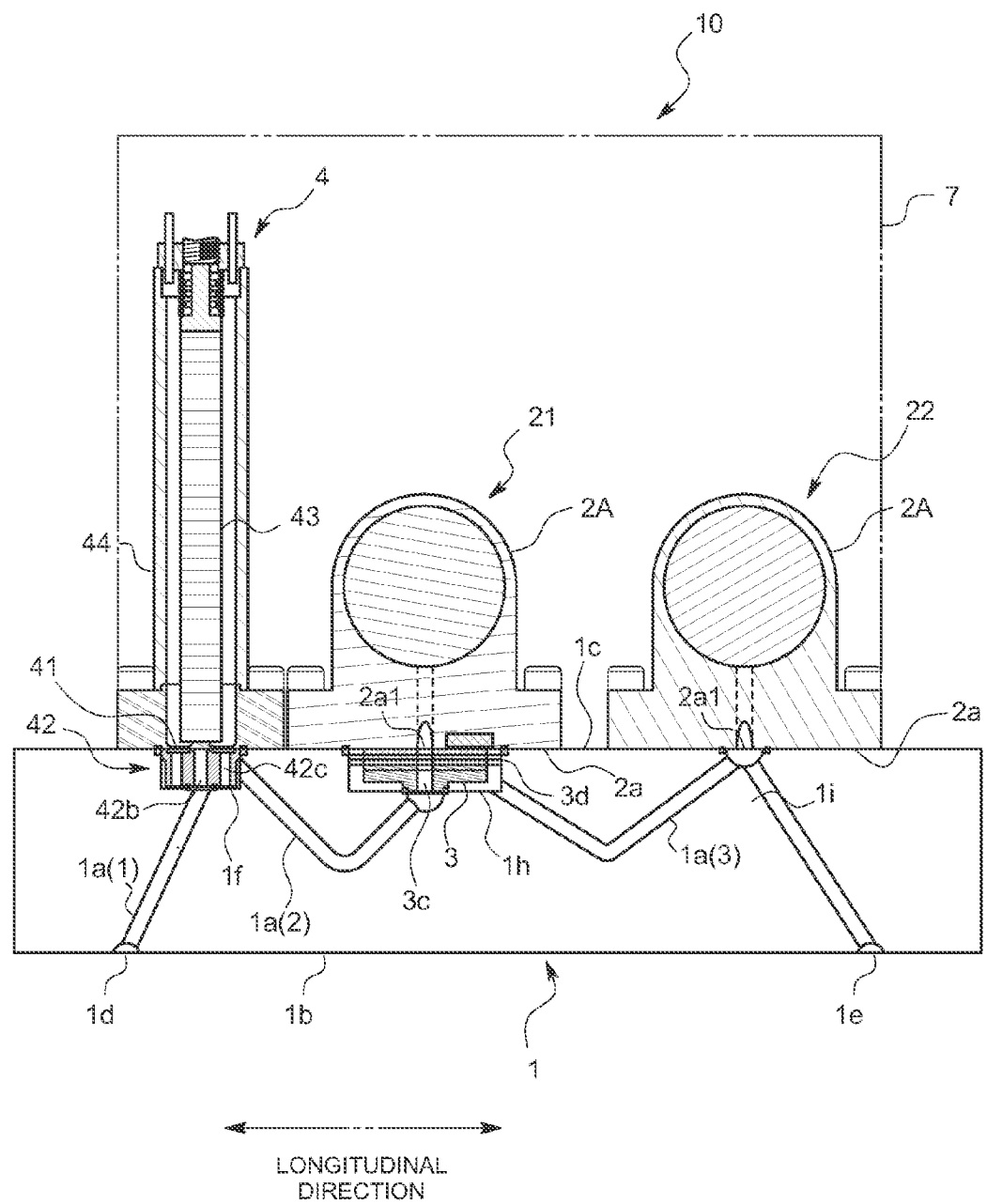
FIG. 5 is a longitudinal cross-sectional view showing an internal structure of the mass flow controller in accordance with this embodiment.
Figure 6:
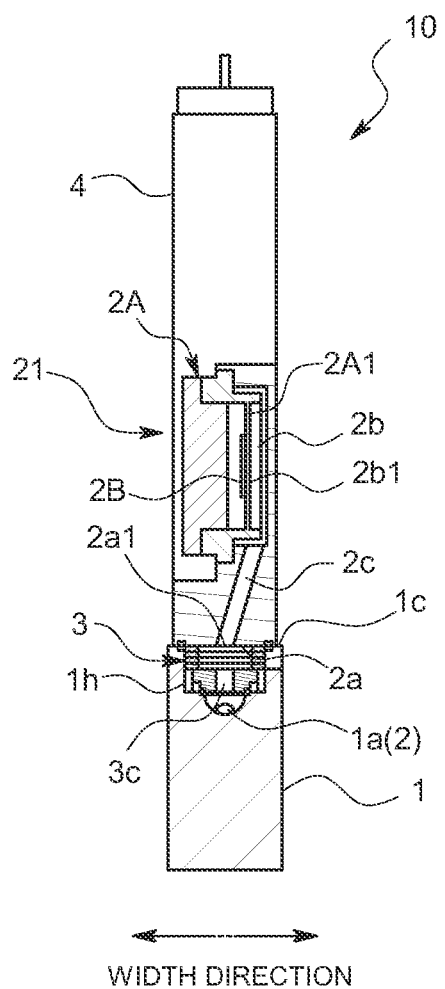
FIG. 6 is a transverse cross-sectional view showing the internal structure of the mass flow controller in accordance with this embodiment.

The body 1 is, as shown in FIGS. 4-6, in a shape of an elongated cuboid made of, for example, metal. A surface parallel to a longitudinal direction of the body 1 is set as a component mounting surface 1c, and components such as the flow rate adjust valve 4, and the pressure sensors 21, 22 are mounted on the component mounting surface 1c alone. A surface opposite to the component mounting surface 1c is a fixing surface 1b to fix the body 1 to a panel or the like. In this embodiment, an input port 1d of the internal flow channel 1a opens at one end part in the longitudinal direction of the fixing surface 1b, and an output port 1e of the internal flow channel 1a opens at the other end of the fixing surface 1b. Nothing is mounted on the other two surfaces (hereinafter called as the side surfaces) that are parallel to the longitudinal direction and it is so configured that a plurality of mass flow controllers 10 can be arranged with the side surface of the body 1 in tight contact with or close to each other.

The internal flow channel 1a extends from one end part in the longitudinal direction of the body 1 to the other end thereof so that the fluid flows substantially in parallel to the longitudinal direction as viewed from a plan direction (hereinafter also called as in a plan view, or top view), which is a direction orthogonal to the component mounting surface 1c. Thus, the plan view is the view from the top of FIG. 4 toward mounting surface 1c. A direction orthogonal to the longitudinal direction viewed from the plan direction is referred to as a width direction.

The flow rate adjust valve 4 is, as shown in FIG. 5, in a columnar shape and mounted vertically on the component mounting surface 1c. The maximum width of the flow rate adjust valve 4 is set to be smaller than or equal to a width (a size in a direction orthogonal to the longitudinal direction) of the component mounting surface 1c. As shown in FIG. 4, it is configured such that the flow rate adjust valve 4 does not project in the width direction from the body 1 in a state that the flow rate adjust valve 4 is mounted on the body 1.

Among members constituting the flow rate adjust valve 4, a valve seat member 42 is in a cylindrical shape where a fluid introducing channel 42b as being a through bore extending in an axial direction is formed in the center, and a fluid discharging channel 42c, which is a through bore extending in an axial direction, is formed in its circumference, and a toric seat surface is formed to project from its top surface and to surround the fluid introducing channel 42b. A closed state wherein the fluid introducing channel 42b and the fluid discharging channel 42c are blocked is made by tightly attaching a valve disc member 41, to be described later, to the seat surface, and an open state wherein the fluid introducing channel 42b is in communication with the fluid discharging channel 42c is made by separating the valve disc member 41 from the seat surface.

The valve seat member 42 is fittingly inserted into a bottomed concave part 1f that opens at one end part of the component mounting surface 1c. The bottomed concave part 1f is arranged at a position to separate the internal flow channel 1a, it is configured such that a terminal end of the upstream side internal flow channel 1a (1) among the internal flow channels 1a is connected to the fluid introducing channel 42b of the valve seat member 42 and a leading end of the downstream side internal flow channel 1a (2) among the internal flow channels 1a is connected to the fluid discharging channel 42c of the valve seat member 42 in a state wherein the valve seat member 42 is fittingly inserted into the bottomed concave part 1f.

Meanwhile, the valve disc member 41 among the components constituting the flow rate adjust valve 4 is in a shape of a diaphragm arranged at a position facing the seat surface. The valve disc member 41 is driven in a manner of being able to make contact with and be separated from the seat surface by a laminated piezoelectric element 43, which is an actuator arranged in a side opposite to the seat surface. The laminated piezoelectric element 43 is housed in a columnar case 44 standing from the component mounting surface 1c.

With this arrangement, the flow rate of the fluid can be controlled by controlling a distance between the seat surface and the valve disc member 41 by applying a predetermined voltage to the laminated piezoelectric element 43.

As a device for measuring the flow rate, the fluid resistive member 3 arranged in the internal flow channel 1a and a pair of pressure sensors 21, 22 to measure the pressure of the fluid in the upstream side and the downstream side of the fluid resistive member 3 respectively, may be used. Each part will now be explained in detail below.

Figure 7:
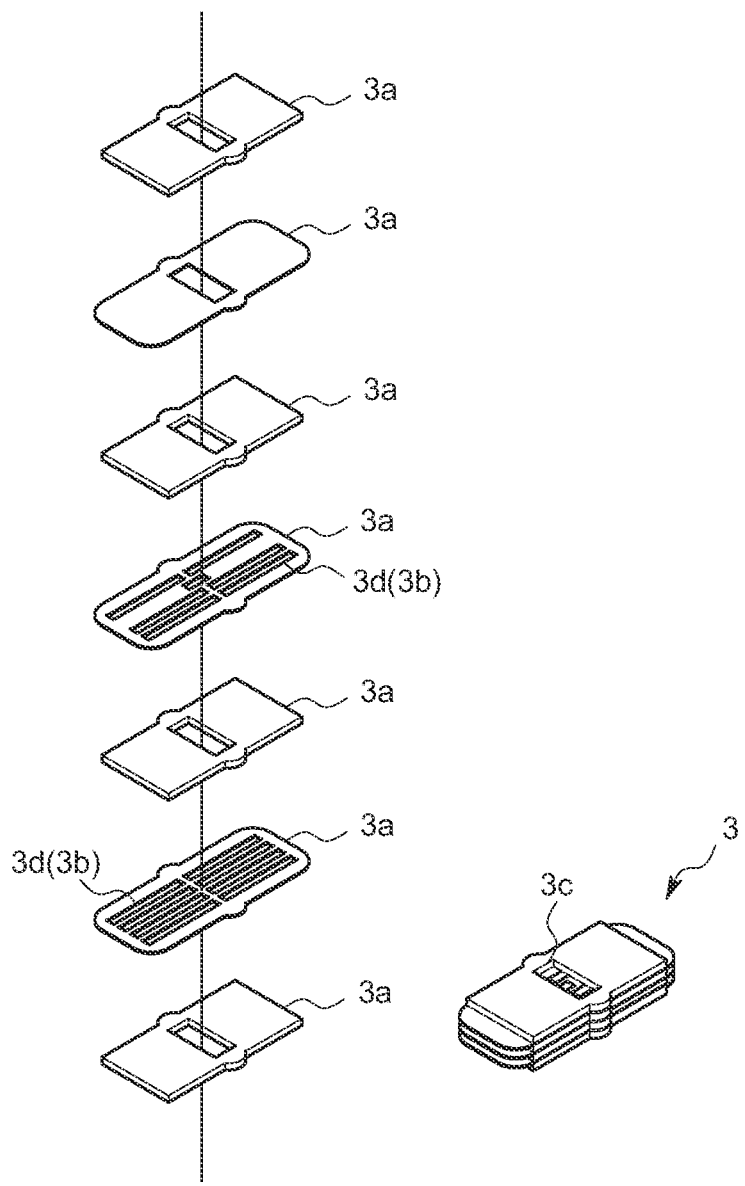
FIG. 7 is an exploded perspective view of a fluid resistive element in accordance with this embodiment.
Figure 8:
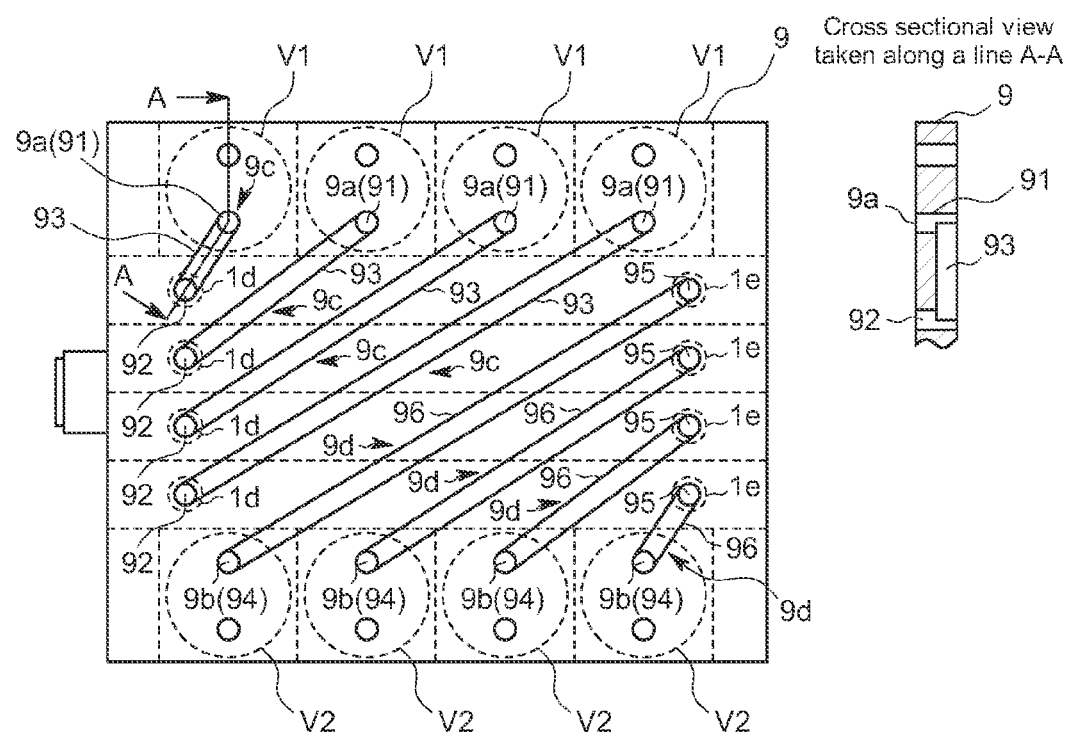
FIG. 8 is a bottom view and a partial cross-sectional view of a support member in accordance with this embodiment.

The fluid resistive member 3 is, as shown in FIG. 5 and FIG. 7, in a cuboid formed by laminating multiple rectangular thin plates 3a, and since it is configured such that the fluid flowing inside becomes a laminar flow, it can be also called as a laminar flow resistive element. The fluid resistive member 3 is provided with a communicating channel 3c that penetrates in the center and a small flow channel 3d whose inside end is in communication with the communicating channel 3c and whose outside end opens to a side direction so that the small flow channel 3d serves as a resistive flow channel. The small flow channel 3d is formed by making a slit 3b on the thin plate 3a, and it is possible to adjust the flow channel resister by varying a shape or a number of the slit 3b formed on the thin plate 3a.

Meanwhile, a rectangular concave part 1h is arranged to separate the internal flow channel 1a on a center part in the longitudinal direction of the component mounting surface 1c of the body 1. The concave part 1h is designed so that the fluid resistive member 3 fits into the concave with no space in the width direction and with a space left in the longitudinal direction.

In a state that the fluid resistive member 3 fits into the concave part 1h, the communicating channel 3c is connected to the terminal end of the upstream side internal flow channel 1a (2) and the outside end of the small flow channel 3d is in communication with the leading end of the downstream side internal flow channel 1a (3). In other words, the upstream side internal flow channel 1a (2) is connected to the downstream side internal flow channel 1a (3) through the communicating channel 3c and the small flow channel 3d.

The pressure sensor 21, 22 comprises, as shown in FIGS. 4-6, a flat body member 2A and an element for detecting pressure 2B incorporated in the body member 2A. The flat body member 2A is mounted on the component mounting surface 1c so as to make a surface plate part (a flat plane surface) be orthogonal to the component mounting surface 1c and substantially in parallel to the longitudinal direction of the body 1, that is, substantially in parallel to a direction of the flow of the fluid in plan view. In addition, a thickness of the pressure sensor 21, 22 is, as shown in FIG. 6, set to be smaller than or equal to the width of the component mounting surface 1c so as not to project the pressure sensor 21, 22 from the body 1 in the width direction when the pressure sensor 21, 22 is mounted on the body 1.

In the body member 2A, as shown in FIG. 6, a pressure-sensitive surface 2b1, which is a surface that is parallel to the surface plate part, a fluid filling chamber 2b in a shape of a thin disk formed by an elastically deformable diaphragm wall 2A1 and a fluid introducing channel 2c that connects the fluid filling chamber 2b and a pressure introducing port 2a1 are in communication with each other. The pressure introducing port 2a1 opens on a mounting surface 2a to be mounted on the body 1.

The element for detecting pressure 2B uses four equivalent electric resistance elements each of which is connected by a bridge connection and each of which is attached to a back surface of the diaphragm wall 2A1. The element for detecting pressure 2B is not limited to this, and may be a piezoelectric element or an electrode of capacitance type that can measure a deformed amount of the diaphragm wall 2A1 that deforms due to a fluid pressure.

The upstream side pressure sensor 21 among a pair of the pressure sensors 21, 22 is mounted on a center part in the longitudinal direction of the component mounting surface 1c of the body 1, and the downstream side pressure sensor 22 is mounted in a downstream of the upstream side pressure sensor 21 on the component mounting surface 1c.

Specifically, the opening of the concave part 1h is airtightly sealed through a toric seal member by the mounting surface 2a and the fluid resistive member 3 in the concave part 1h is sandwiched with pressure between the bottom surface of the concave part 1h and the mounting surface 2a by mounting the upstream side pressure sensor 21 on the body 1. With this arrangement, since there is no need of sealing the fluid resistive member 3 by the use of a cover for exclusive use, it is possible to reduce a number of components and to promote simplifying the assembling process, resulting in cost reduction.

In addition, the communicating channel 3c of the fluid resistive member 3 is connected to the pressure introducing port 2a1 of the upstream side pressure sensor 21 and the upstream side internal flow channel 1a (2) upstream of the resistive flow channel 3a is in communication with the upstream side pressure sensor 21 though the communicating channel 3c.

Meanwhile, the internal flow channel 1a (3) located in the downstream side of the resistive flow channel 3a extends in the longitudinal direction of the body 1 so as to reach the fluid output port 1e and is connected to the pressure introducing port 2a1 of the downstream side pressure sensor 22 in the mid-course.

An information processing circuit 6 physically comprises a CPU, a memory, an I/O channel, an A/D converter, a D/A converter and other analog and digital electric circuits. The information processing circuit 6 functions as a flow rate calculation circuit 61 and a control circuit 62 as shown in FIG. 3 in cooperation with the CPU and other peripheral devices based on programs stored in the memory.

Concretely, the flow rate calculation circuit 61 receives a pressure measurement signal from the pressure sensors 21, 22 and calculates and output a mass or a volume flow rate of the fluid flowing in the internal flow channel 1a based on the value of the mass or the value of the volume flow rate and a fluid resistive characteristics of the fluid resistive member 3 previously stored in the memory.

Meanwhile, the control circuit 62 outputs a control signal to the flow rate adjust valve 4, applies a voltage to the laminated piezoelectric element 43 and controls the fluid flow rate so as to make the fluid flow rate of the internal flow channel 1a calculated by the flow rate calculation circuit 61 to be a set flow rate indicated, i.e., set, externally.

Next, the upstream side open/close valve V1 and the downstream side open/close valve V2 will be explained.

Each of the open/close valves V1, V2 is, for example, of an electromagnetic driving type that can take two states, namely, fully open and fully closed alone, and as shown in FIG. 2 comprises a square mounting base plate part (Va) and a generally column-shaped body part (Vb) that stands from a surface plate part of the mounting base pate part (Va). A size required for arranging the open/close valves V1, V2 is determined by a size of the mounting base plate part (Va) viewed from the plan direction, and a length of its one side is longer than a width (a width of the body 1) of the mass flow controller 10.

Next, the support member 9 will be explained.

The support member 9 is of a rectangular plate shape having an equal thickness and one surface plate part (hereinafter also called as a top surface) supports a plurality of the mass flow controllers 10, the upstream side open/close valves V1 and the downstream side open/close valves V2.

A plurality of the mass flow controllers 10 are supported with each side surface of the body 1 tightly attached each other so as to be in a rectangular shape as a whole viewed from the plan direction. Namely, each of the mass flow controllers 10 is arranged on the support member 9 so that the longitudinal direction of each mass flow controller 10 is in parallel with the others and each input port 1d and each output port 1e are located serially at even intervals in the width direction, which is a direction orthogonal to the longitudinal direction viewed from the plan direction.

The upstream side open/close valves V1 are arranged on a top surface of the support member 9 serially in the longitudinal direction external to and outside of the mass flow controller 10 located at the end in the width direction. Meanwhile, the downstream side open/close valves V2 are arranged on the top surface of the support member 9 serially in the longitudinal direction in an opposite side of the upstream side open/close valves V1, namely, outside of the mass flow controller 10 located at the other end in the width direction.

Furthermore, a plurality of introducing ports 9a serially arranged at even intervals in the longitudinal direction of the mass flow controller 10 located at one of the most outside positions and a plurality of discharging ports 9b serially arranged at even intervals in the longitudinal direction of the mass flow controller 10 located at the other most outside position are arranged for the support member 9. The introducing port 9a is connected to the input port 1d and introduces the fluid into the input port 1d, and the discharging port 9b is connected to the output port 1e and discharges the fluid from the output port 1e.

Concretely, a plurality of introducing paths 9c each of which is of a linear shape in plan view and a plurality of discharging paths 9d each of which is of a linear shape in plan view are formed; each of the introducing paths 9c connects in sequence starting from the introducing port 9a locating at a position nearest to the input port 1d and the input port 1d located at a position nearest to the introducing port 9a and ending with the introducing port 9a located at a position farthest from the input port 1d and the input port 1d located at a position farthest from the introducing port 9a, each of the discharging paths 9d connects in sequence starting from the discharging port 9b located at a position nearest to the output port 1e and the output port 1e located at a position nearest to the discharging port 9b ending with the discharging port 9b located at a position farthest to the output port 1e and the output port 1e located at a position farthest to the discharging port 9b.

In this embodiment, the introducing port 9a is formed on a top surface opening of a bore 91 penetrating the support member 9 in a thickness direction. The upstream side open/close valve V1 is arranged so as to locate an outlet port of the upstream side open/close valve V1 above the introducing port 9a.

The introducing path 9c comprises the bore 91, a through bore 92 that is formed just beneath the input port 1d of the mass flow controller 10 on the support member 9 and that is in communication with the input port 1d, and a bottomed groove 93 formed linearly so as to connect a bottom surface opening part of the bore 91 and a bottom surface opening part of the through bore 92.

The same is applied to the discharging port 9b and the discharging path 9d.

Namely, the discharging port 9b is formed on a top surface opening of a bore 94 penetrating the support member 9 in the thickness direction, and the downstream side open/close valve V2 is arranged so as to locate an inlet port of the downstream side open/close valve V2 above the discharging port 9b.

In addition, the discharging path 9d comprises the bore 94, a through bore 95 that is formed just beneath the output port 1e of the mass flow controller 10 on the support member 9 and that is in communication with the output port 1e, and a bottomed groove 96 formed linearly so as to connect a bottom surface opening part of the bore 94 and a bottom surface opening part of the through bore 95.

Although not shown in drawings, a sealing plate is mounted on a bottom surface of the support member 9 so that each bottom surface opening of the bottomed grooves 93, 96, the bores 91, 94 and the through bores 92, 95 is sealed.

Furthermore, in this embodiment, a part of the information processing circuit 6 is commonly arranged for each mass flow controller 10, and the commonly used part of the information processing circuit 6 is housed in a second housing 8 arranged on top surfaces of the first housings 7 each of which is arranged adjacently. The other part of the information processing circuit 6 that is not commonly used is housed each of the first housings 7 respectively. An outline of the second housing 8 substantially falls in an outline of all of the first housings 7 viewed from a plan direction.

In accordance with this arrangement, since the open/close valves V1, V2 are arranged not back and forth but to the side of the mass flow controller 10 in the longitudinal direction, it becomes possible to arrange multiple mass flow controllers 10 each of whose side surfaces adjacent tightly even though the total arranged length of the open/close valve V1, V2 is longer than the width of the mass flow controllers 10. Accordingly, a compact configuration whose area efficiency is improved can be realized, which minimizes the footprint of the fluid mechanism 100 without any wasted space.

Figure 9:
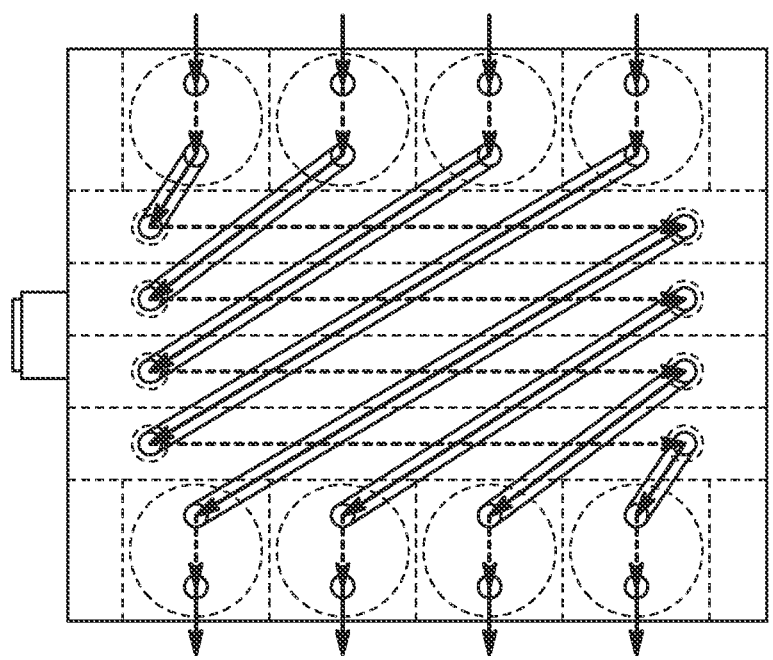
FIG. 9 is a fluid flowing chart showing a flow of a fluid in accordance with this embodiment.
Figure 10:
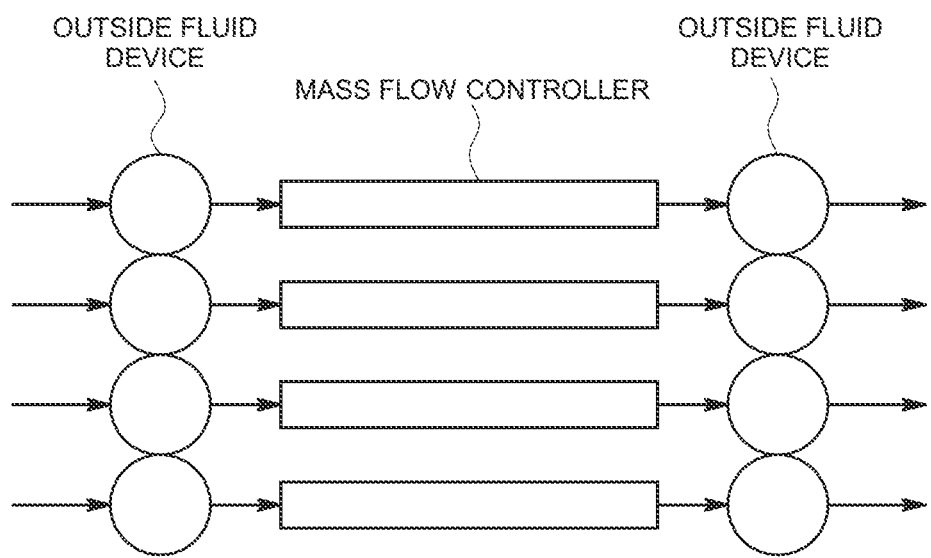
FIG. 10 is a schematic diagram showing an example of a conventional configuration of a fluid mechanism.
Figure 11:
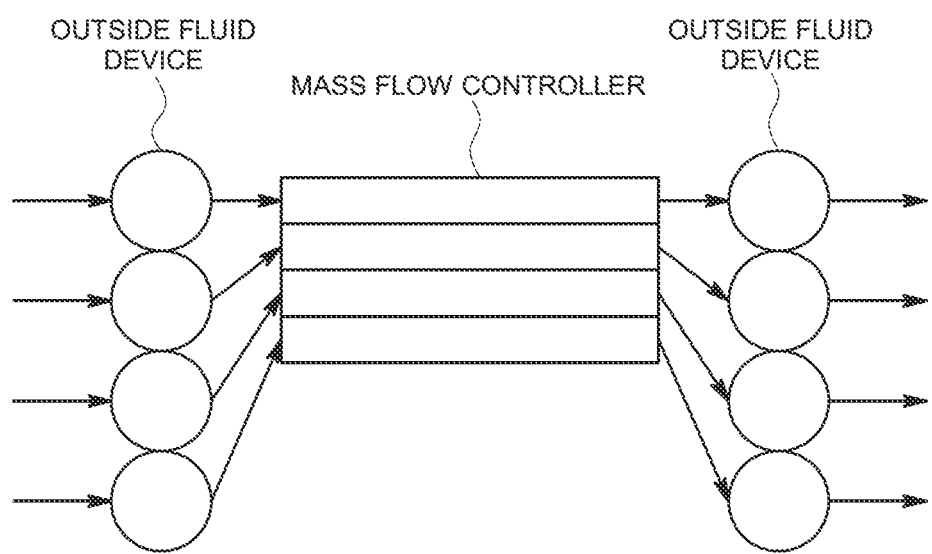
FIG. 11 is a schematic diagram showing an example of a conventional configuration of a fluid mechanism.

In addition, in case that a length of each flow channel from the introducing port 9a to the discharging port 9b is compared, as a flow rate of the fluid is shown by an arrow in FIG. 9, since the short introducing path 9c is connected to the long discharging path 9d, it becomes possible to suppress fluctuation of the length of each flow channel. Accordingly, there is no critical problem in fluctuation of response. Furthermore, the size of the fluid mechanism 100 in the longitudinal direction can be substantially suppressed to the size of the mass flow controller 10 alone in the longitudinal direction.

Furthermore, since the second housing 8 that houses the information processing circuit 6 is arranged on the top surface of the first housing 7 and the outline of the second housing 8 substantially falls in the outline of all of the first housings 7 viewed from the plan direction, no additional space for the information processing circuit 6 is required viewed from the plan direction.

The present claimed invention is not limited to the above-mentioned embodiment. For example, the mass flow controller (the flow rate controller) is represented as the fluid device unit in the above-mentioned embodiment, however, it may be another device unit such as a flow meter (a flow rate measuring device) without a flow rate adjust valve.

In addition, the support member is not limited to the plate shape, and may be formed by multiple pipes.

The introducing channel and the discharging channel are not limited to a straight line shape, and may be curved.

The external fluid device is not limited to the open/close valve, and may be a three-way valve, a pressure sensor, a fluid resistive element, or a flow rate adjust valve. In addition, the external fluid device is not necessarily arranged in both sides of the fluid device unit, and may be arranged in one side (for example, the open/close valve V1 alone).

The external fluid device may not necessarily be arranged accurately in a straight line, may be arranged slightly zigzag in view of the layout.

Figure 12:
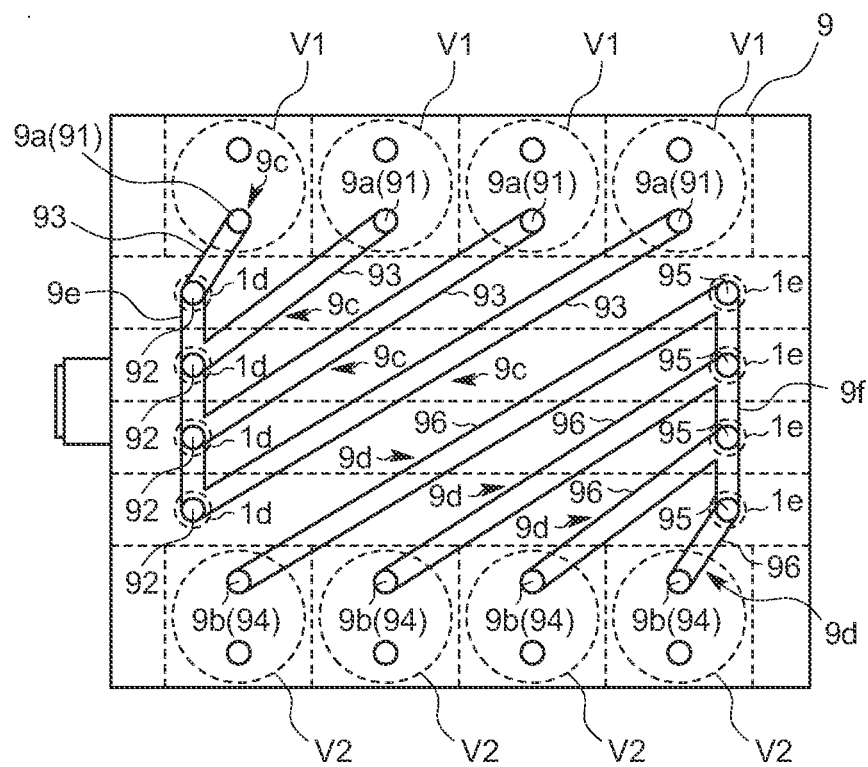
FIG. 12 is a bottom view of a support member in accordance with another embodiment of this invention.

As shown in FIG. 12, an input communizing flow channel 9e that puts each input port 1d in common use or an output communizing flow channel 9f that puts each output port 1e in common use may be arranged on the support member. In accordance with this arrangement, it becomes possible to mix or distribute the fluid. The input port alone or the output port alone may be communized. For example, in case that the input port is communized, the fluid can be distributed. In this case, if the fluid is a similar gas, only one introducing port is used and other introducing port may be closed.

In addition, the number of the fluid device unit is optimally set as four considering the relation of the size of the fluid device unit and the external fluid device viewed from the plan direction in the above-mentioned embodiment, however, if the relation changes, the number of the fluid device units may also preferably be changed.

Furthermore, either one or a plurality of input ports and one or a plurality of output ports among the adjacent fluid device units may be set in a direction opposite to that of the other fluid device unit. In addition, each of the fluid device units may be arranged with its side surface in the longitudinal direction adjacent each other, and it is not necessary that the input port or the output port of the adjacent fluid device unit is arranged accurately in line in the width direction each other. In this regard, however, an arrangement wherein each of the fluid device unit is arranged serially in the longitudinal direction is not included.

In addition, the present claimed invention is not limited to the above-mentioned embodiment and may be variously modified without departing from a spirit of the invention.

A second embodiment will be explained.

Figure 13:
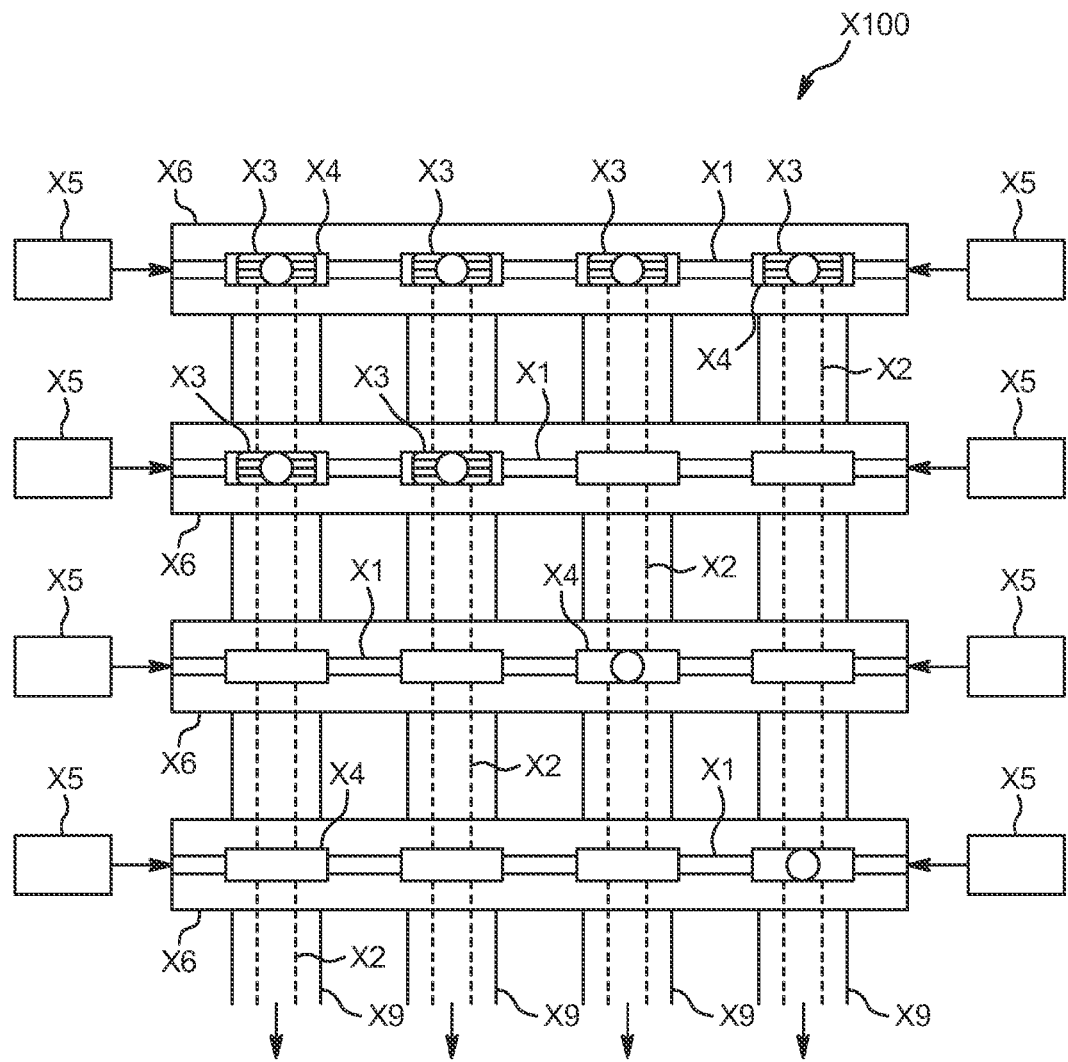
FIG. 13 is a schematic plan view of a fluid control system in accordance with a second embodiment of this invention.

A fluid control system X100 in accordance with the second embodiment is to produce and supply a material gas used in, for example, a semiconductor manufacturing process by mixing a component gas, and has, as shown in the schematic diagram of FIG. 13, a plurality of (four, in this embodiment) primary flow channels and a plurality of (four, in this embodiment) secondary flow channels X2 on an imaginary plane (in the plane of the paper of the drawing of FIG. 13, in this embodiment).

Each of the primary flow channels X1 extends linearly and arranged in parallel each other at even intervals. In addition, each of the secondary flow channels X2 extends linearly in a direction orthogonal to the primary flow channel X1 at even intervals, and the primary flow channels X1 and the secondary flow channels X2 are so configured in a latticed state viewed from the direction of the imaginary plane.

A gas supply device (a flow rate control device, in this embodiment) X5 is connected at both ends of the primary flow channel X1 respectively so that a different kind (or the same kind) of the component gas flows in the primary flow channel X1 from each of the gas supply devices X5 in a direction opposite each other.

The primary flow channel X1 is connected to the secondary flow channel X2 at an intersect point where the primary flow channel X1 intersects with the secondary flow channel X2 viewed from the direction of the imaginary plane. However, the primary flow channel X1 is connected to the secondary flow channel X2 at not all of the intersect points, but only at the required part of the intersect points.

In addition, an installation area X4 is arranged for each intersect point respectively, and it is so configured that a fluid resistive element X3 can be arranged in a detachable manner to the installation area X4. The fluid resistive element X3 is not necessarily arranged for all of the installation areas X4 (or the intersection points), and the fluid resistive element X3 is installed for a required part of the installation area X4 alone in this embodiment.

Figure 14:
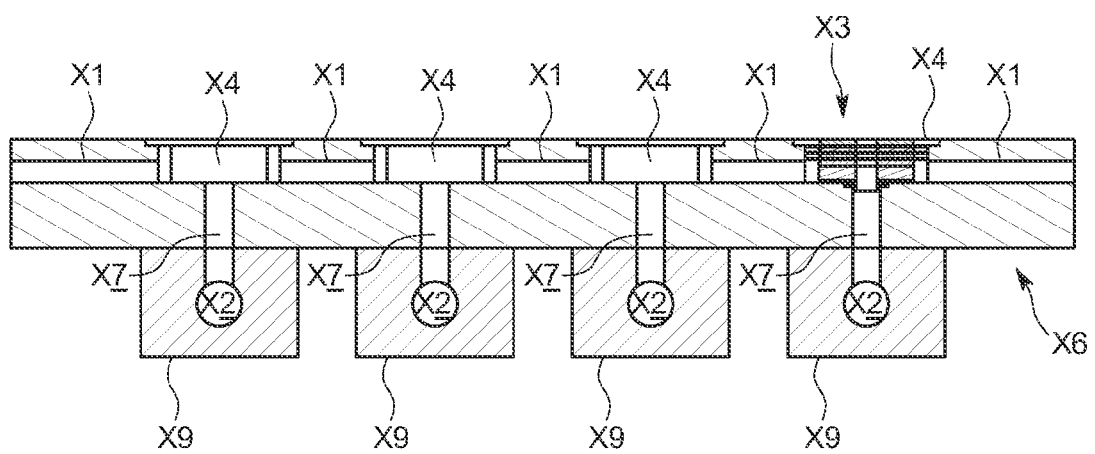
FIG. 14 is a longitudinal cross-sectional view of a primary flow channel forming member in accordance with this embodiment.
Figure 15:
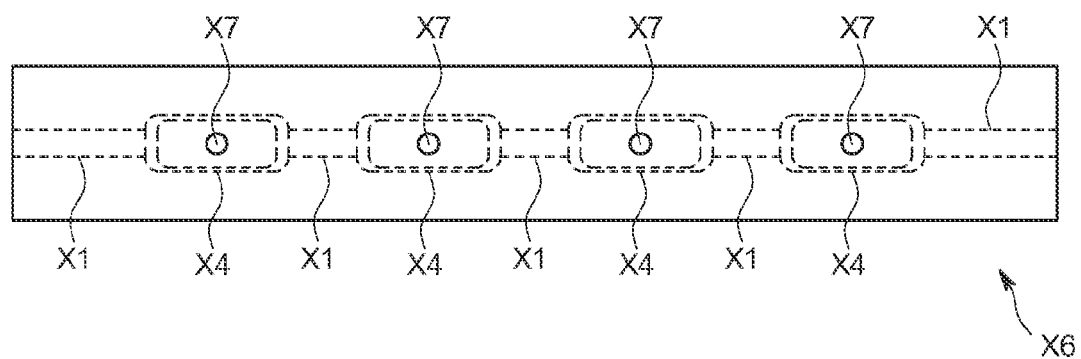
FIG. 15 is a plan view of the primary flow channel forming member in accordance with this embodiment.

More detail will now be explained. The primary flow channel X1 is formed, as shown in FIG. 14 and FIG. 15, to penetrate a primary flow channel forming member X6 of a rectangular bar shape in a longitudinal direction. In addition, similar to the primary flow channel X1, the secondary flow channel X2 is formed to penetrate a secondary flow channel forming member X9 of a rectangular bar shape in a longitudinal direction. The secondary flow channel forming member X9 is arranged to be orthogonal to the primary flow channel forming member X6 while making contact with a bottom surface of the primary flow channel forming member X6. The secondary flow channel forming member X9 and the primary flow channel forming member X6 are laminated at the intersect point. Accordingly, the primary flow channel X1 and the secondary flow channel X2 are in a skew relation, and the primary flow channel X1 and the secondary flow channel X2 are connected by a through bore X7, to be described later.

A plurality of installation areas X4 of a concave shape opening upward are arranged on the primary flow channel forming member X6 so as to separate the primary flow channel X1. The fluid resistive element X3 is arranged on the primary flow channel X1 by embedding the fluid resistive element X3 into the installation area X4. The opening on the top surface of the installation area X4 is sealed by arranging a cap body, not shown in drawings, on the top surface of the primary flow channel forming member X6.

In addition, the through bore X7 that opens on the bottom surface of the primary flow channel forming member X6 and that is connected to the secondary flow channel X2 is arranged on the bottom surface of each installation area X4.

Figure 16:
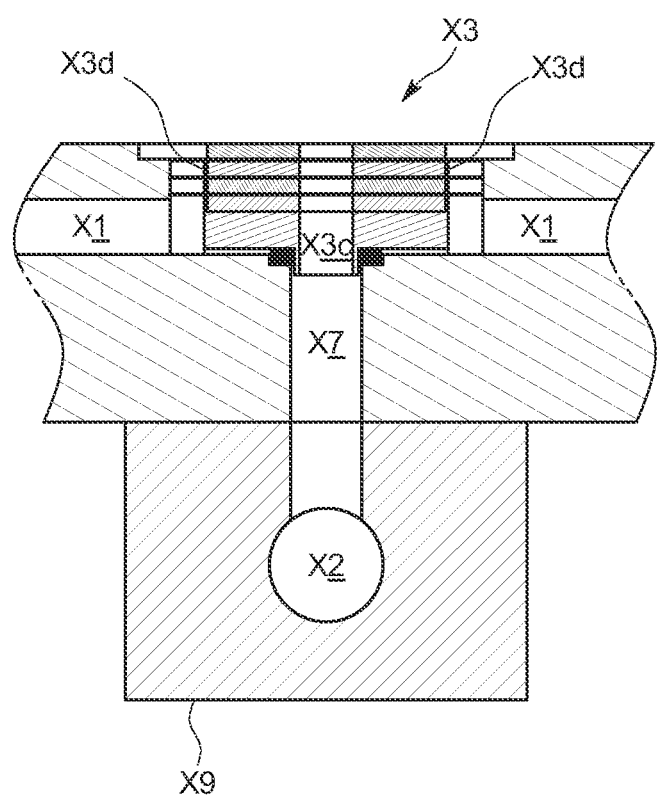
FIG. 16 is a transverse cross-sectional view of a fluid resistive element mounted on the primary flow channel forming member in this embodiment.
Figure 17:
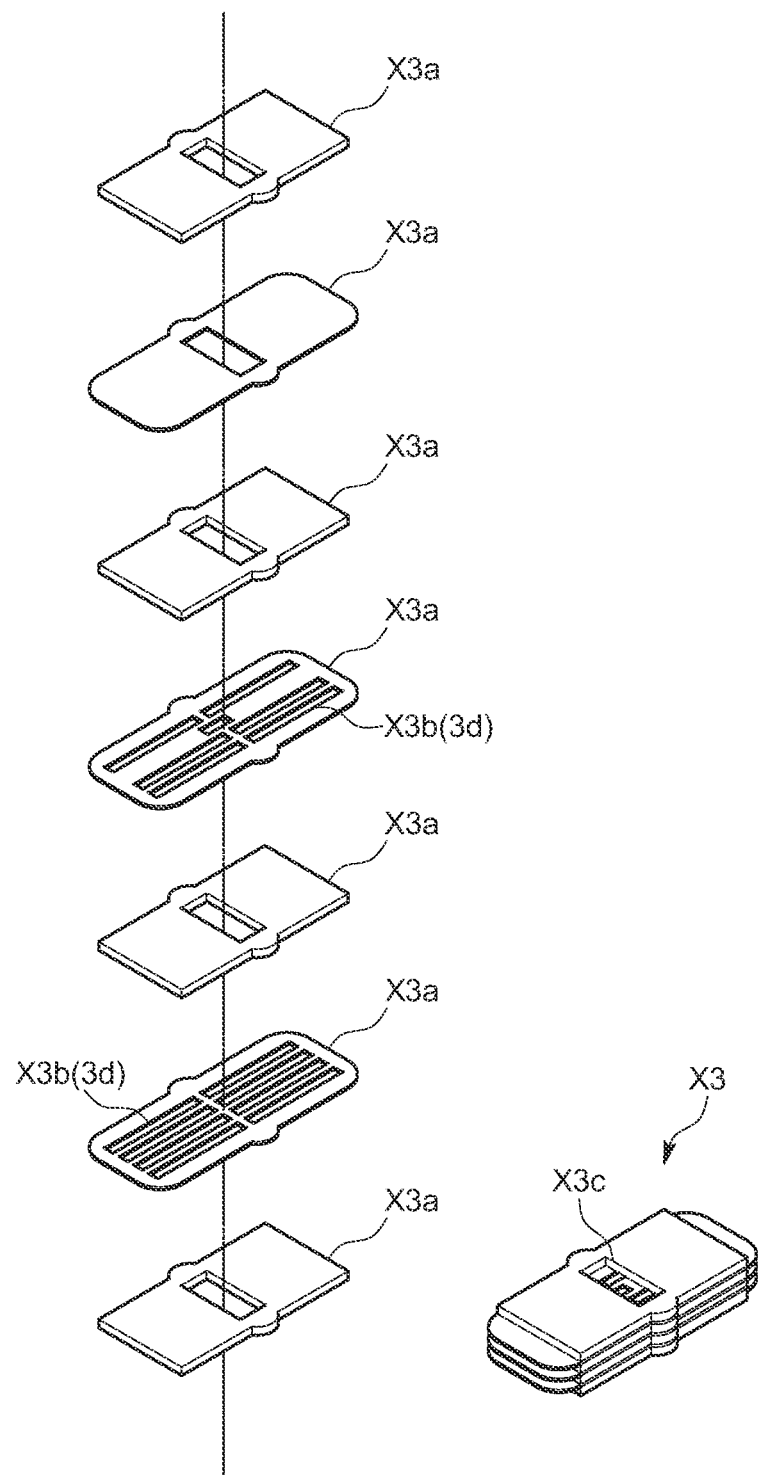
FIG. 17 is an exploded perspective view of the fluid resistive element in this embodiment.

The fluid resistive element X3 is, as shown in FIG. 16, FIG. 17, in a cuboid by laminating multiple rectangular thin plates X3a, and can be also called as a laminar flow resistive element because the fluid flows inside of the fluid resistive element X3 in a laminar flow state. The fluid resistive element X3 is provided with a large channel X3c that penetrates the center, and a pair of small channels X3d whose inner end is in communication with the large channel X3c and whose outer end opens to each side direction, and the small channels X3d serve as the substantial resistive flow channel. The fluid resistive element is not limited to the laminar flow resistive element, and may be a turbulent flow resistive element such as an orifice.

In this embodiment, the large channel X3c has a diameter that cannot be a substantial resistive flow channel, and its bottom surface is connected to the through bore X7. In addition, the small channel X3d is formed by providing a slit X3b on a thin plate X3a, and the flow channel resistor can be adjusted by varying a shape or a number of the slit X3b formed on the thin plate X3a.

In a state that the fluid resistive element X3 is arranged in the installation area X4, the large channel X3c is in communication with the secondary flow channel X2 and each small channel X3d is in communication with the upstream side and the downstream side of the installation area X4 in the primary flow channel X1 respectively.

Figure 18:
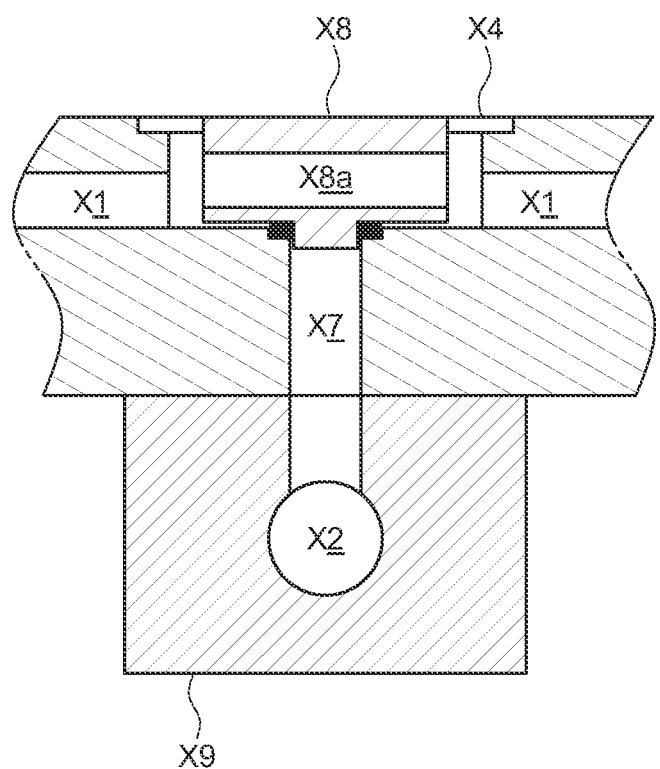
FIG. 18 is a transverse cross-sectional view showing a connecting member mounted on the primary flow channel forming member in this embodiment.

It is possible to arrange not only the fluid resistive element X3 but also other components in the installation area X4, and also possible to arrange nothing in the installation area X4. For example, as shown in FIG. 18, it is possible to block the connection between the primary flow channel X1 and the secondary flow channel X2 at the intersect point by arranging a connection member X8 having a communication channel X8a that penetrates in the same direction as that of the primary flow channel X1 and a sealing surface that seals a top surface of the through bore X7. In addition, if nothing is arranged in the installation area X4, the primary flow channel X1 and the secondary flow channel X2 are connected without any substantial fluid resistance at the intersect point.

Figure 19:
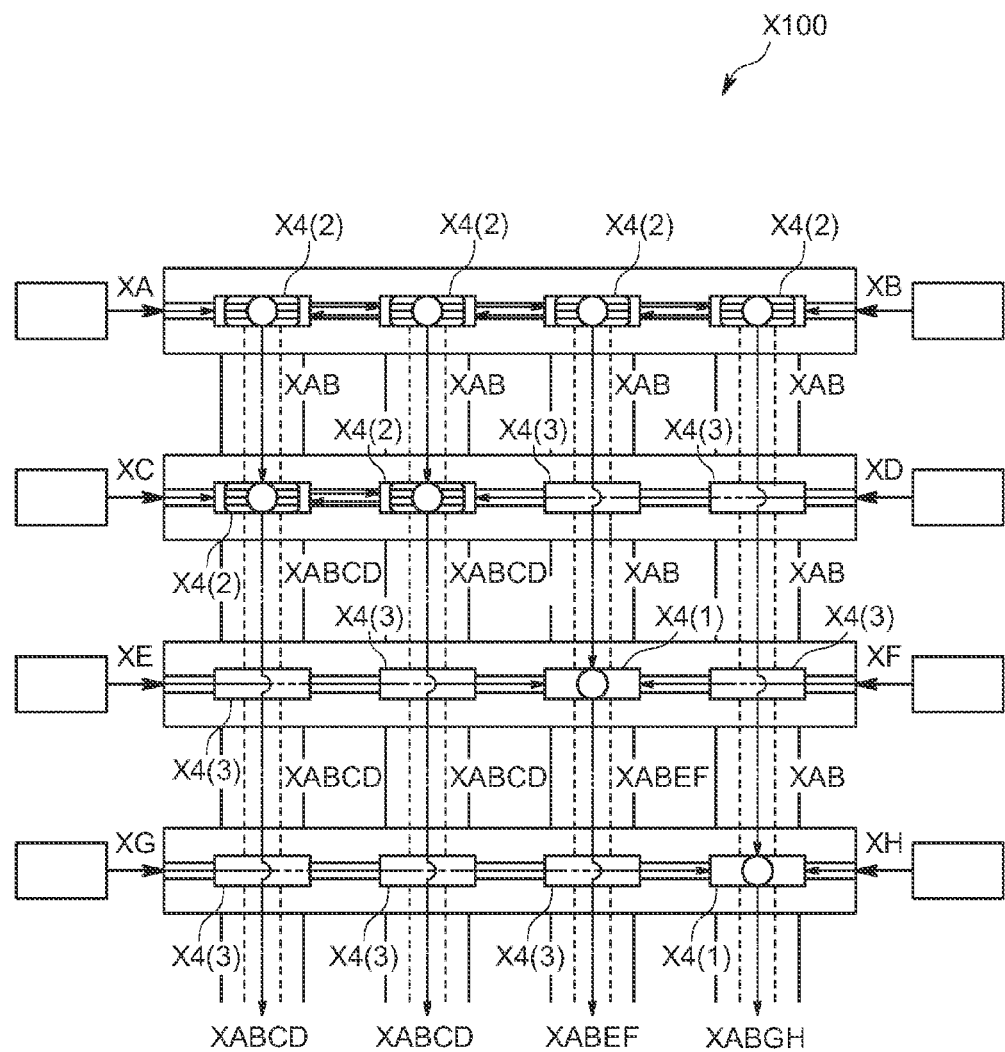
FIG. 19 is an operational explanatory view showing an operation of the fluid control system in this embodiment.

Next, an example of an operation of the fluid control system X100 having the above arrangement will be explained based on FIG. 19. A gas used for manufacturing semiconductors is taken as an example of the fluid. A code X4(1) in FIG. 19 shows the installation area X4 where nothing is arranged, a code X4(2) shows the installation area X4 where the fluid resistive element X3 is arranged, and a code X4(3) shows the installation area X4 where the connecting member X8 is arranged. In addition, each of the secondary flow channels X2 is connected to a plurality of gas introducing ports arranged in a semiconductor manufacturing chamber, not shown in drawings, respectively.

According to this example, a component gas XA and a component gas XB are mixed in the first step primary flow channel X1, and a mixed gas XAB is divided with a ratio according to the resistance characteristics of each fluid resistive element X3 arranged in the first step primary flow channel X1.

Next, a component gas XC and a component gas XD are mixed in the next step primary flow channel X1, and the mixed gas XCD is divided with a predetermined ratio into the first line secondary flow channel X2 and the second line secondary flow channel X2 and mixed with the mixed gas XAB that flows in the secondary flow channel X2. In other words, the mixed gas XABCD flows in the first line secondary flow channel X2 and the second line secondary flow channel X2, and the mixed gas XAB flows in the third line secondary flow channel X2 and the forth line secondary flow channel X2.

Next, a component gas XE and a component gas XF are mixed in the third step primary flow channel X1, and all of the mixed gas XEF flows into the third line secondary flow channel X2. As a result, the mixed gas XABEF flows into the third line secondary flow channel X2.

Finally, a component gas XG and a component gas XH are mixed in the final step primary flow channel X1 and all of the mixed gas XGH flows into the forth line secondary flow channel X2. As a result, the mixed gas XABGH flows into the forth line secondary flow channel X2.

As mentioned, in accordance with the second embodiment, it is possible to freely mix and divide a plurality of component gases and to flow various kinds of mixed gases in the secondary flow channel X2. In addition, since the flow rate of each component gas can be controlled by the flow rate control device X5, the concentration of the component gas also can be controlled freely.

Furthermore, although the flow rate, the component and the concentration of the gas flowing in each secondary flow channel X2 can be controlled respectively with an extremely high degree of freedom, the configuration is simply to arrange the primary flow channels X1 and the secondary flow channels X2 in a matrix and the fluid resistive element X3 or the connecting member X8 is arranged at the intersect point according to the required specification, thereby simplifying and downsizing the system X100. In addition, since the fluid resistive element X3 or the connecting member X8 can be dismounted and the fluid resistive element X3 can change its resistor characteristics variously, it is possible to flexibly cope with a change of the specification of the system.

The present claimed invention is not limited to the above-mentioned embodiment. For example, if a pressure sensor is mounted on an opening of a top surface of the installation area X4 where the fluid resistive element X3 is arranged, the installation area X4 can be sealed and the fluid flow rate flowing in the secondary flow channel X2 can be measured by making use of the pressure measured by a pressure sensor additionally arranged in the secondary flow channel X2.

In addition, the fluid resistive element X3 or the connecting member X8 is arranged at the intersect point in the installation area viewed from the imaginary plan direction in the above-mentioned embodiment, and for example, an installation area may be arranged in mid-course of the through bore X7.

Furthermore, the primary flow channel X1 and the secondary flow channel X2 are in a skew relationship in the above-mentioned embodiment; however, they may be arranged on the same plane. For example, this state can be realized by tightly attaching the top surface of one of the primary flow channel forming members X6 to the bottom surface of another primary flow channel forming member X6. In this case, the secondary flow channel is formed by the through bore X7 and the large channel X3c.

In addition, the present claimed invention is not limited to the above-mentioned embodiment and may be variously modified without departing from a spirit of the invention.

EXPLANATION OF REFERENCE CHARACTERS

100 . . . fluid mechanism
10 . . . mass flow controller (fluid device unit)
21 . . . upstream side pressure sensor (fluid device)
22 . . . downstream side pressure sensor (fluid device)
3 . . . fluid resistive member (fluid device)
6 . . . information processing circuit
7 . . . first housing
8 . . . second housing
9a . . . introducing port
9b . . . discharging port
1d . . . input port
1e . . . output port
9c . . . introducing path
9d . . . discharging path
X100 . . . fluid control system
X1 . . . primary flow channel
X2 . . . secondary flow channel
X3 . . . fluid resistive element
X4 . . . installation area

The invention claimed is:

1. A fluid control system comprising:
a primary flow channel that extends in parallel to an imaginary plane;
a plurality of secondary flow channels that intersect with the primary flow channel viewed from a position above the imaginary plane and that are so configured to be connected to the primary flow channel at the intersect points and into which a part of a fluid flowing in the primary flow channel flows; and
a fluid resistive element that is arranged in an installation area set at least at one of the intersect points and that determines a ratio of the fluid flow rate flowing from the primary flow channel into at least one of the plurality of secondary flow channels, wherein
the fluid resistive element is configured with an internal channel through which at least a portion of the fluid flows from one side of the primary flow channel into the at least one of the plurality of secondary flow channels, and through which a remaining portion of the fluid flows from the one side of the primary flow channel to a second side of the primary flow channel, and
the primary flow channel and the plurality of secondary flow channels are configured in a skewed relationship.

2. The fluid control system described in claim 1, further comprising:
a fluid supply device connected to each end of the primary flow channel so as to flow the fluid into the primary flow channel from each end respectively.

3. The fluid control system described in claim 1, further comprising a plurality of primary flow channels, and which is characterized in that multiple primary flow channels and multiple secondary flow channels are configured in a latticed state viewed from the position above the imaginary plane.

4. The fluid control system described in claim 1, wherein the installation area is arranged in the primary flow channel.

5. The fluid control system described in claim 1, wherein at least a portion of the internal channel is a large channel; and inside of the fluid resistive element are formed the large channel where substantially no resistance is generated and a pair of small channels that are bifurcated from the large channel and where resistance is generated, the large channel of the fluid resistive element being arranged in the installation area in communication with at least one of the plurality of secondary flow channels, and each of the small channels being in communication with an upstream side and a downstream side in the installation area of the primary flow channel respectively.

* * * * *